US010205738B2

(12) United States Patent
Subramanya et al.

(10) Patent No.: US 10,205,738 B2
(45) Date of Patent: Feb. 12, 2019

(54) ADVANCED PERSISTENT THREAT MITIGATION

(71) Applicant: Cisco Technology, Inc., San Jose, CA (US)

(72) Inventors: Sindhu Subramanya, San Jose, CA (US); Anand Pulicat Gopalakrishnan, Milpitas, CA (US); Payal Shah Rambhia, Santa Clara, CA (US); Amey Magar, San Jose, CA (US); Lio Cheng, Fremont, CA (US); Ningjia Huang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 223 days.

(21) Appl. No.: 15/208,176

(22) Filed: Jul. 12, 2016

(65) Prior Publication Data

US 2018/0020017 A1 Jan. 18, 2018

(51) Int. Cl.
*H04L 29/06* (2006.01)
*H04L 12/24* (2006.01)
*G06F 21/57* (2013.01)
*G06F 21/55* (2013.01)

(52) U.S. Cl.
CPC ........ *H04L 63/1433* (2013.01); *G06F 21/552* (2013.01); *G06F 21/575* (2013.01); *H04L 41/0816* (2013.01); *H04L 41/0853* (2013.01); *H04L 41/0863* (2013.01); *H04L 41/28* (2013.01); *H04L 63/101* (2013.01); *H04L 63/1441* (2013.01)

(58) Field of Classification Search
CPC .............. H04L 63/1441; H04L 63/101; H04L 63/1433; H04L 41/0853; H04L 41/0816; H04L 41/0681; G06F 21/575
USPC .......................................................... 726/25
See application file for complete search history.

(56) References Cited

U.S. PATENT DOCUMENTS

| 6,122,639 | A  | * | 9/2000  | Babu  | H04L 12/12 |
| 6,282,175 | B1 | * | 8/2001  | Steele | G06F 11/0709 |
|           |    |   |         |       | 370/254 |
| 8,032,619 | B2 | * | 10/2011 | Kato  | H04L 67/38 |
|           |    |   |         |       | 709/203 |
| 9,183,158 | B2 |   | 11/2015 | O'Loughlin et al. | |
| 2002/0112095 | A1 | * | 8/2002 | Ford | H04L 41/0253 |
|           |    |   |         |       | 719/330 |

(Continued)

FOREIGN PATENT DOCUMENTS

WO 2015004598 A1 1/2015

*Primary Examiner* — Syed A Zaidi
(74) *Attorney, Agent, or Firm* — Edell, Shapiro & Finnan, LLC

(57) ABSTRACT

A method is presented in which a system reduces the risk of an advanced persistent threat ("APT") detected at one or more network devices by implementing one or more mitigation actions depending on the nature of the detected threat. Accordingly, in response to detecting the risk of an APT at one or more network devices, a centralized controller implements one or more mitigation actions to minimize the vulnerability of an enterprise network to unauthorized access to one or more network resources. A centralized controller may therefore instruct one or more network devices to take appropriate mitigation actions depending on the nature of an APT detected on one or more network devices.

20 Claims, 10 Drawing Sheets

(56) References Cited

U.S. PATENT DOCUMENTS

| | | | |
|---|---|---|---|
| 2003/0202663 A1* | 10/2003 | Hollis | H04L 63/0272 380/282 |
| 2004/0003388 A1* | 1/2004 | Jacquemot | G06F 8/60 717/174 |
| 2004/0189439 A1 | 9/2004 | Cansino | |
| 2008/0232274 A1* | 9/2008 | Grover | H04L 41/024 370/255 |
| 2008/0244071 A1* | 10/2008 | Parupudi | G06Q 10/06 709/226 |
| 2010/0229096 A1* | 9/2010 | Maiocco | G06F 15/173 715/734 |
| 2013/0014263 A1* | 1/2013 | Porcello | H04L 63/0272 726/25 |
| 2014/0059385 A1* | 2/2014 | Dolinsky | H04L 41/0856 714/33 |
| 2014/0164249 A1 | 6/2014 | Guerrino et al. | |
| 2015/0172321 A1 | 6/2015 | Kirti et al. | |
| 2016/0070611 A1 | 3/2016 | Kim | |
| 2016/0078236 A1 | 3/2016 | Chesla | |

\* cited by examiner

ADVANCED PERSISTENT THREAT MITIGATION

TECHNICAL FIELD

The present disclosure relates to techniques to mitigate an advanced persistent threat detected on one or more network devices in a computer networking system.

BACKGROUND

An advanced persistent threat ("APT") is a network attack in which the threat remains in the network for as long as possible to avoid traditional threat detection methods and to remain hidden from system administrators. In so doing, an APT may allow an attacker to compromise the integrity of the network, e.g., by installing malware, creating backdoor entries into the network, creating unauthorized connections and bridges between different switches and routers, or exfiltrating sensitive information out to an external collector device. For example, a hidden rootkit may hook out network monitoring entry points as a means to avoid detection, providing an attacker with root access to the network system.

DESCRIPTION OF EXAMPLE EMBODIMENTS

In accordance with one embodiment, a method is presented herein in which the risk of an advanced persistent threat is detected at one or more network devices. In response to detecting the risk of an advanced persistent threat at one or more network devices, a network controller implements one or more mitigation actions to minimize the vulnerability of an enterprise network to unauthorized access to one or more network resources. Accordingly, the network controller instructs one or more network devices to take appropriate mitigation actions depending on the nature of the advanced persistent threat detected on the one or more network devices. More specifically, the network controller receives management plane information associated with a configuration of one or more network devices in a network. The network controller determines whether the configuration of the one or more network devices has changed based on the management plane information. In response to determining that the configuration of the one or more network devices has changed, the network controller executes one or more mitigation actions in the network.

Example Embodiments

Figure 1:
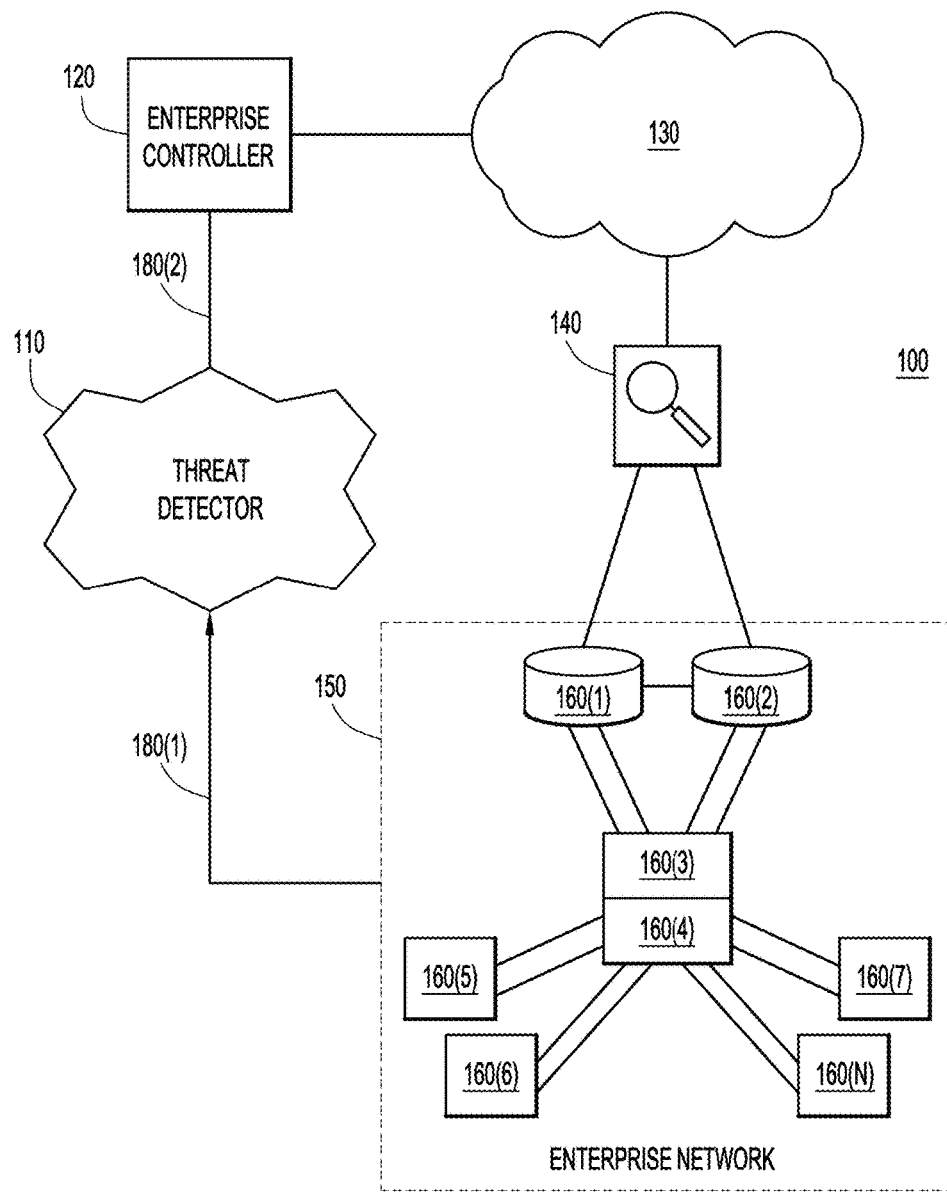
FIG. 1 is a block diagram of a network environment in which a centralized network controller mitigates the risk of an advanced persistent threat, according to an example embodiment.

With reference first to FIG. 1, there is depicted a block diagram of a network environment 100 in which one or more mitigation actions are employed to reduce the potential harm of an advanced persistent threat to network resources, according to an embodiment. Network access environment 100 includes a threat detector device 110, an enterprise network controller 120, which is in communication over network 130 with security appliance 140, which is in communication with enterprise network 150. Network 150 may be in communication with threat detector (subsystem) 110 over channel 180(1), while threat detector 110 may be in communication with controller 120 over communication channel 180(2). Network 150 may include one or more one or more network devices, e.g., devices 160(1)-160(N), which may be password protected. According to an embodiment, network 150 may be a software-defined network ("SDN"). According to a further embodiment, network 150 may be a greenfield or a brownfield network.

Network 130 may include one or more wide area networks (WANs), such as the Internet, and one or more local area networks (LANs). The one or more network devices 160(1)-160(N) in enterprise network 150, are configured to route management plane traffic from controller 120 to enterprise network 150 over network 130, and may route management plane information from network 150 to threat detector 110 over channel 180(1). The one or more network devices 160(1)-160(N) may be a wireless access point, gateway, router, switch, etc., deployed to coordinate the reception and transmission of management plane information packets between enterprise controller 120 and enterprise network 150, and enable communication between network 150 and threat detector 110. The one or more network devices 160(1)-160(N) may route or switch network traffic flows in accordance with any communication/network technology, including, but not limited to, Internet Protocol version 4 (IPv4), IPv6, Transport Control Protocol (TCP), Universal Datagram Protocol (UDP), Wi-Fi®, 4G or Long Term Evolution (LTE), etc. According to an embodiment, the one or more network devices 160(3) and 160(4) may be a network server or a client device. According to a further embodiment, the one or more management plane traffic originating from controller 120 may comprise an IP packet flow.

Security appliance 140 may inspect incoming data packets and implement security policies to provide one or more security functions on behalf of enterprise network 150. According to an embodiment, the one or more security functions provided by security appliance 140 may include intrusion detection, virtual private networks, firewall, anti-virus scanning, and content/spam filtering. According to a further embodiment, security appliance 140 may be an adaptive security appliance ("ASA").

Threat detector 110 is configured to receive management plane reports from one or more network devices 160(1)-160(N) over channel 180(1), enabling monitoring of events occurring in enterprise network 150. Threat detector 110 may analyze the received reports to determine whether an event has occurred that may cause a vulnerability of an advanced persistent threat in enterprise network 150. For example, after receiving management plane reports from enterprise network 150, threat detector 110 may store the management plane reports in its memory and compare the reports with pre-stored events to determine the appropriate mitigation response. According to an embodiment, the one or more network devices 160(1)-160(N) are configured to transmit one or more management plane reports to both threat detector 110 and to enterprise controller 120. According to a further embodiment, the management plane reports may be transmitted periodically at one or more configurable intervals or may be transmitted dynamically in response to a detected occurrence of a pre-determined event. According to a further embodiment, the reports may be transmitted in accordance with a plug-and-play protocol ("PnP").

The threat detector 110 is configured to receive one or more management plane reports from one or more network devices 160(1)-160(N) and, after analyzing the management plane reports, determine whether the reports indicate one or more threats on the one or more network devices 160(1)-160(N). Threat detector 110 is further configured to send a threat report to controller 120 identifying the one or more threats, as well as identifying the one or more network devices 160(1)-160(N) that are potentially at risk from the identified one or more threats, so that controller 120 may determine one or more mitigation actions to mitigate potential damages to enterprise network 150 from the one or more identified threats. According to an embodiment, threat detector 110 may be a cloud-based threat detection system. According to a further embodiment, the functionality of threat detector 110 may be performed entirely at threat detector 110, at controller 120, or at both threat detector 110 and controller 120.

Enterprise network controller 120 is configured to receive one or more threat reports from threat detector 110 over channel 180(2). According to an embodiment, the one or more threat reports may identify specific threat detection data received from one or more network devices 160(1)-160(N) that were affected by the detected threats. In response to receiving one or more threat reports from threat detector 110, controller 120 may analyze the received reports to identify one or more appropriate mitigation actions and "push down" the identified mitigation actions to network 150. According to an embodiment, controller 120 may identify the appropriate mitigation actions for specific threats based on pre-defined configurations received from a user or system administrator.

Figure 2:
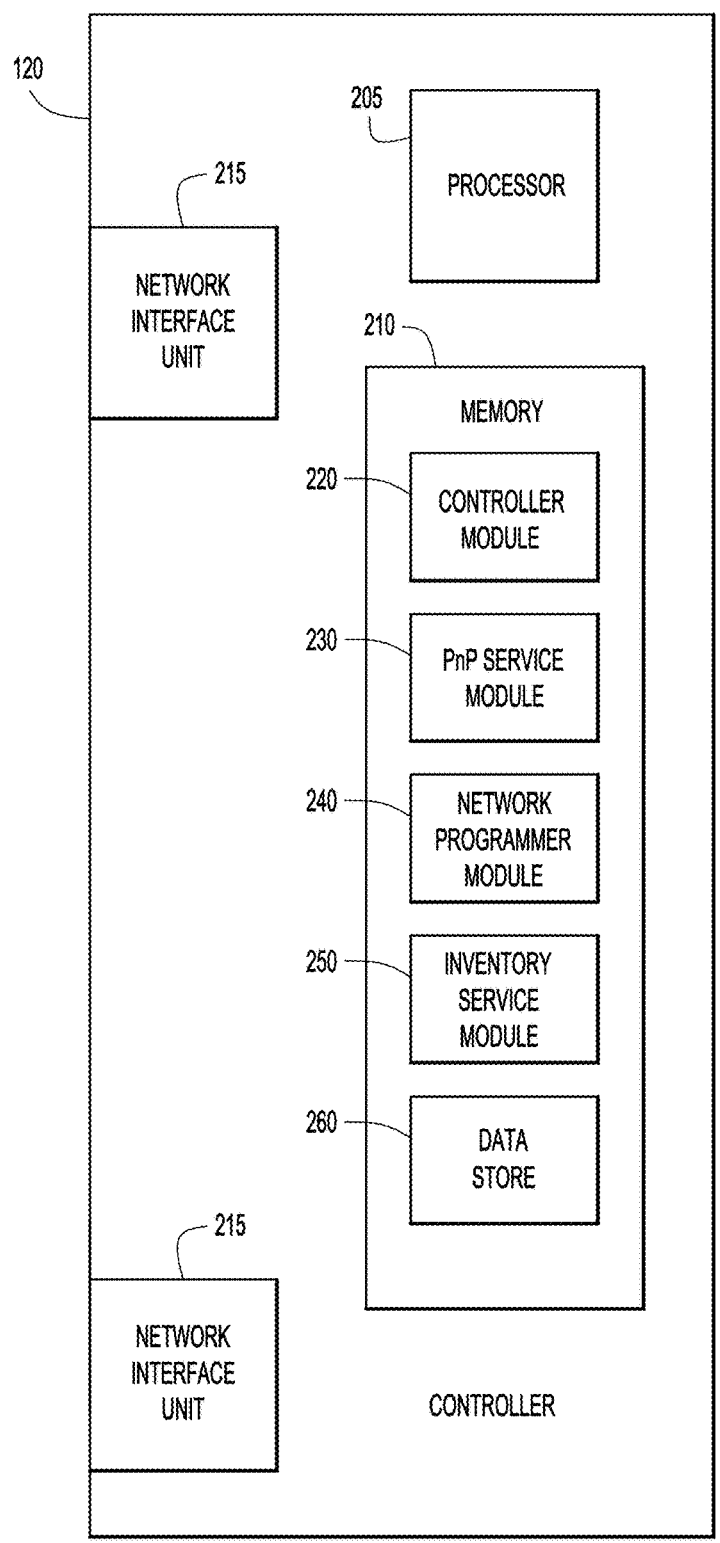
FIG. 2 is a high-level block diagram of a network controller configured to participate in the threat mitigation methods presented herein, according to an example embodiment.

With reference to FIG. 2, the network controller 120 of FIG. 1 is now described in more detail. Reference may also be made to FIG. 1 in connection with the description of FIG. 2. Controller 120 includes one or more processors 205, a memory 210, and one or multiple network interface units 215. The one or more processors 205 may be a microprocessor or a microcontroller. Network interface unit 215 may be a network interface card that enables network communication, such as wired or wireless network communication, e.g., to communicate with threat detector 110 and one or more network devices, e.g., devices 210. Memory 220 may include read only memory (ROM), random access memory (RAM), magnetic disk storage media devices, optical storage media devices, flash memory devices, electrical, optical, or other physical/tangible memory storage devices. Processor 205 executes instructions stored in memory 210 for the controller module 220, PnP service module 230, network programmer module 240 and inventory service module 250. For example, processor 205 may execute instructions of controller module 220 to analyze one or more threats identified by threat detector 110 to determine one or more actions appropriate to mitigate the damage or vulnerabilities created by the one or more identified threats. In addition, the memory 210 includes data store 260 allocated to storing threat reports generated by threat detector 110, user-defined configuration information identifying appropriate mitigation actions, and images that may be used to revert one or more network devices, e.g., devices 210, to an authorized pre-configured image.

Thus, in general, memory 210 may include one or more tangible (non-transitory) computer readable storage media (e.g., a memory device) encoded with software comprising computer executable instructions and, when the software is executed (by processor 205), it is operable to perform the operations of controller 120 described herein. Controller 120 may be configured by a system administrator to define specific events that may indicate one or more threats for which controller 120 should execute one or more mitigation actions.

Figure 3:
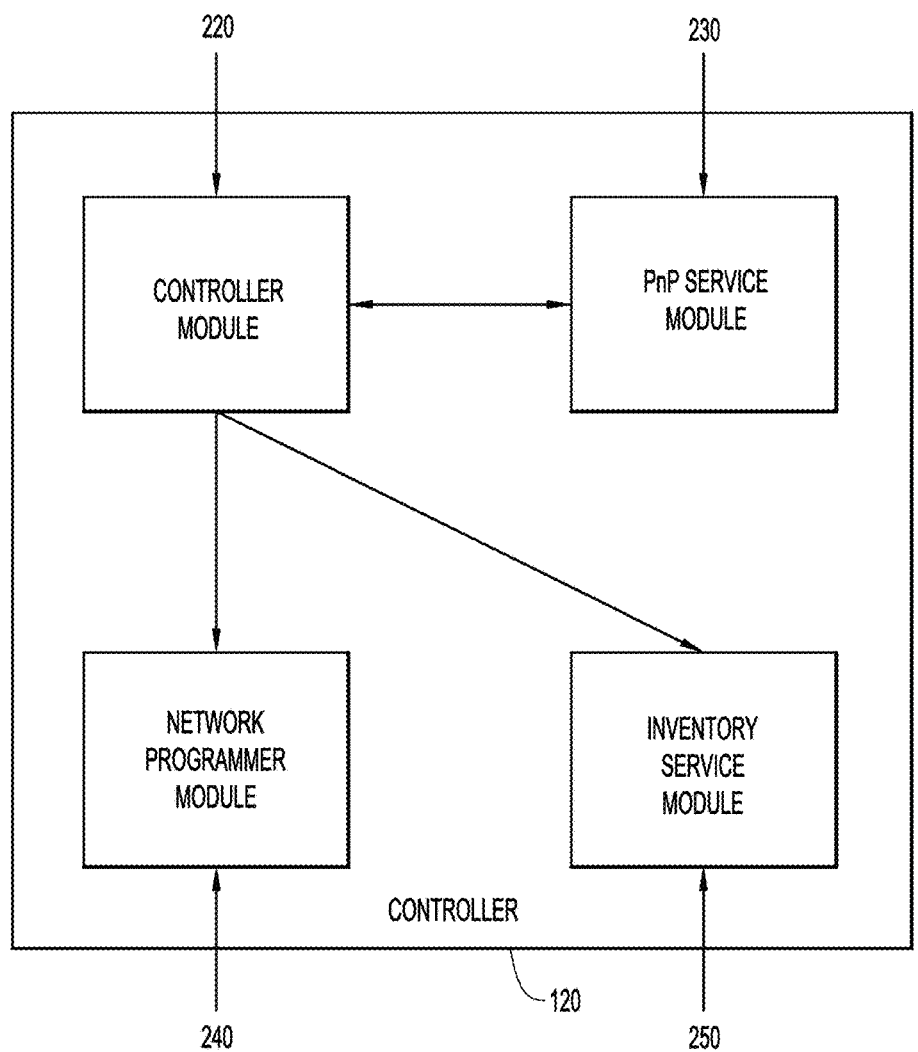
FIG. 3 is a functional block diagram of the network controller, according to an example embodiment.

With reference to FIG. 3, a functional block diagram illustrating the operational flow of controller 120 is shown in more detail. Reference may also be made to FIGS. 1 and 2 in connection with the description of FIG. 3.

PnP service module 220 may periodically receive or transmit management plane traffic indicating one or more configuration changes to one or more network devices 160(1)-160(N). According to an embodiment, PnP service module may continuously poll one or more network devices 160(1)-160(N) for information related to unauthorized configuration changes. According to a further embodiment, PnP service module 230 may receive configuration data from one or more network devices 160(1)-160(N) at pre-defined intervals, e.g., according to a "call home" protocol. Network programmer module 240 may also receive management plane reports from the one or more network devices 160(1)-160(N) indicating the configuration state of the one or more network devices 160(1)-160(N). According to an embodiment, network programmer module 240 may receive reports indicating the software state and hardware capabilities of the one or more network devices 160(1)-160(N) including the release dates and versions of software installed on the devices 160(1)-160(N). Inventory service module 250 may comprise configuration information related to enterprise network 150. According to an embodiment, inventory service module 250 includes information identifying authorized network devices 160(1)-160(N) as well as information identifying the nearest neighbors for each of the authorized network devices 160(1)-160(N).

Accordingly, controller module 220 receives configuration data related to one or more network devices 160(1)-160(N) from PnP Service module 230, network programmer module 240 and inventory service module 250, as well as threat reports from threat detector 110. In response to receiving the configuration information and threat reports, controller module 220 may determine one or more actions to mitigate the detected threats based on pre-defined user-configurations identifying appropriate mitigation actions for specific threats. For example, a system administrator may have defined that the appropriate action when one or more network devices 160(1)-160(N) have reported unauthorized configuration changes may be to reset all network passwords associated with devices 160(1)-160(N) to predefined values. Accordingly, if controller module 220 receives information indicating one or more unauthorized configuration changes to one or more devices 160(1)-160(N), controller module 220 may reset the passwords associate with each network device 160(1)-160(N) to the user-defined password stored in memory 210.

Thus, in general, controller module 220 may receive inputs from a system administrator, threat detector 110 and network devices 160(1)-160(N) to determine different mitigation mechanisms, depending on the nature of the detected threat.

Figure 4:
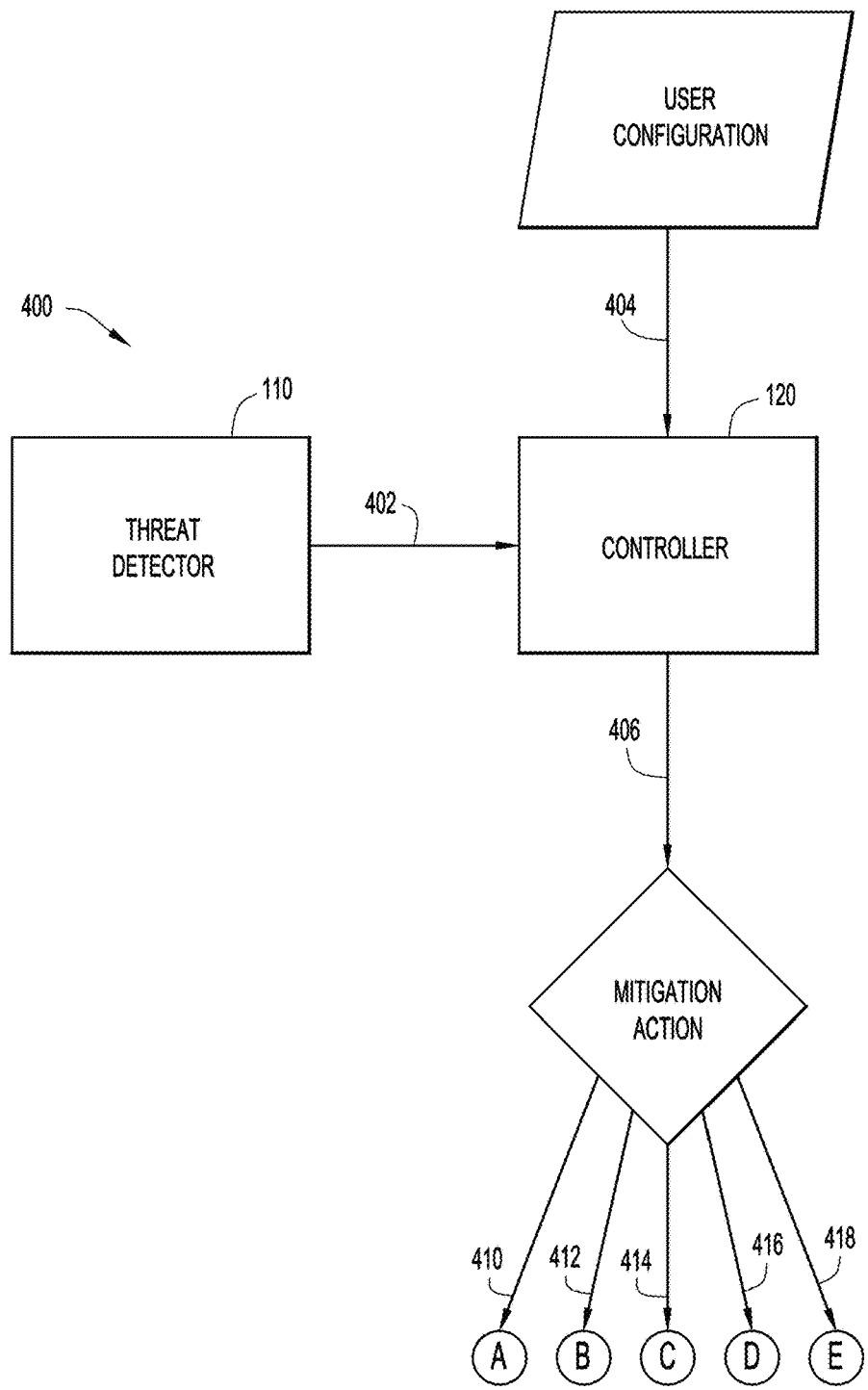
FIG. 4 is a high-level flowchart of operations performed to mitigate potential damages caused by a detected threat on one or more network devices, according to an example embodiment.

With reference to FIG. 4, a flowchart is shown for example operations of a method 400 performed by controller 120 to mitigate the exposure of enterprise network 150 to one or more detected threats, according to an embodiment. Reference may also be made to FIGS. 1-3 in connection with the description of FIG. 4.

At 402, controller 120 receives a threat report from threat detector 110 identifying possible threats to an enterprise network, e.g., network 150, based on one or more events or conditions detected at one or more network devices, e.g., devices 160(1)-160(N). At 404, a user, e.g., system administrator provides configuration information to controller 120 identifying appropriate mitigation actions for specific detected threats. According to an embodiment, the user configuration information may be pre-defined and stored in memory 210 of the controller 120. According to a further embodiment, the user configuration information may be provided dynamically in response to a threat notification displayed by controller 120. At 406, based on the threat report received at 402 and the user configuration information received at 404, controller 120 identifies one or more mitigation actions to take and sends one or more commands to the one or more network devices, e.g., 160(1)-160(N), to implement the one or more identified mitigation actions.

For example, at 410, controller 120 may detect one or more unplanned configuration changes identifies and, in response, revert the configurations of the one or more network devices 160(1)-160(N) to a pre-defined trusted configuration (mitigation plan "A"). Control then passes to 520. Similarly, at 412, controller 120 may determine to isolate one or more potentially infected network devices 160(1)-160(N) (mitigation plan "B"), and control passes to 530. At 414, controller 120 may detect one or more corrupted images on one or more potentially infected network devices 160(1)-160(N) and determine to rollback the one or more corrupted images to one or more pre-approved images (mitigation plan "C"). Control then passes to 540. At 416, controller 120 may determine to clear the remote access lines to the one or more network devices 160(1)-160(N) (mitigation plan "D"), and control passes to 550. At 418, controller 120 may detect that a user has inserted one or more external cards into the one or more network devices 160(1)-160(N) and, in response, initiate an alarm signal (mitigation plan "E"). Control then passes to 560. It is to be understood that the mitigation plans "A"-"E" are for illustrative purposes only and that controller 120 may be configured to mitigate any number of detected threats.

Figure 5A:
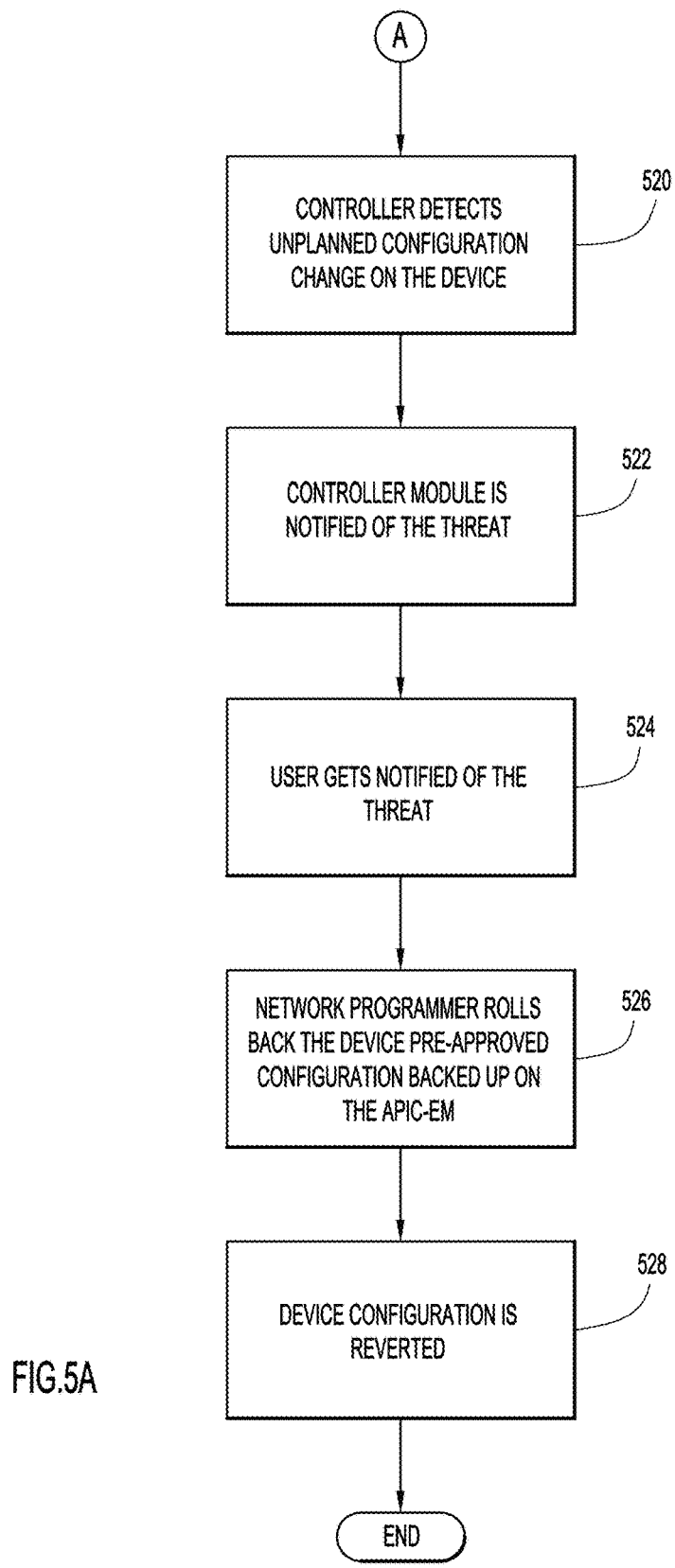
FIGS. 5A-5E are flowcharts of operations performed to mitigate the damages caused by a specific detected threat on one or more network devices, according to an example embodiment.

With reference to FIG. 5A, a flowchart is shown for example operations of a method performed by controller 120 to revert the configuration of one or more network devices, e.g., devices 160(1)-160(N), back to a trusted configuration when one or more of the network devices 160(1)-160(N) have reported one or more unplanned configuration changes. Reference may also be made to FIGS. 1-4 in connection with the description of FIG. 5A.

Initially, at 520, controller 120 detects an unplanned configuration change on one or more network devices 160(1)-160(N). According to an embodiment, PnP service module 230 or inventory service module 250 may receive a notification of the unplanned configuration change on the one or more network devices 160(1)-160(N) in response to PnP service module 230 or inventory service module 250 continuously polling the one or more network devices 160(1)-160(N) for notifications of one or more unauthorized or unplanned configuration changes.

At 522, PnP service module 330 or inventory module 350 notifies controller module 220 of the detected threat. At 524, controller module 220 notifies the user, e.g., system administrator, of the detected threat. According to an embodiment, controller 120 provides the user with an option to roll-back one or more network devices, e.g., devices 160(1)-160(N), to a pre-approved image that is stored in memory 210 At 526, network programmer module 340 instructs one or more network devices 160(1)-160(N) to roll-back the configuration of the one or more network devices 160(1)-160(N) to a pre-approved image that is stored in memory 310. At 528, controller 220 determines that the one or more network devices 160(1)-160(N) have successfully reverted to the pre-approved image, and the process ends.

In one embodiment, a list is received of one or more network devices when a configuration change has occurred on the one or more network devices or the one or more network devices has not responded to one or more polling signals (from the network controller) within a predetermined time interval. In addition, a list is received of one or more interfaces connecting one or more neighbor devices to the one or more network devices when a configuration change has occurred on the one or more network devices or the one or more network devices has not responded to one or more polling signals. The one or more network devices are removed from a network access list when a configuration change has occurred or the one or more network devices is determined not to be reachable (due to failure of the network controller to receive a response to a polling signal within a predetermined time interval). The one or more interfaces may be teared down when a configuration change has occurred or the one or more network devices is determined to not be reachable.

Figure 5B:
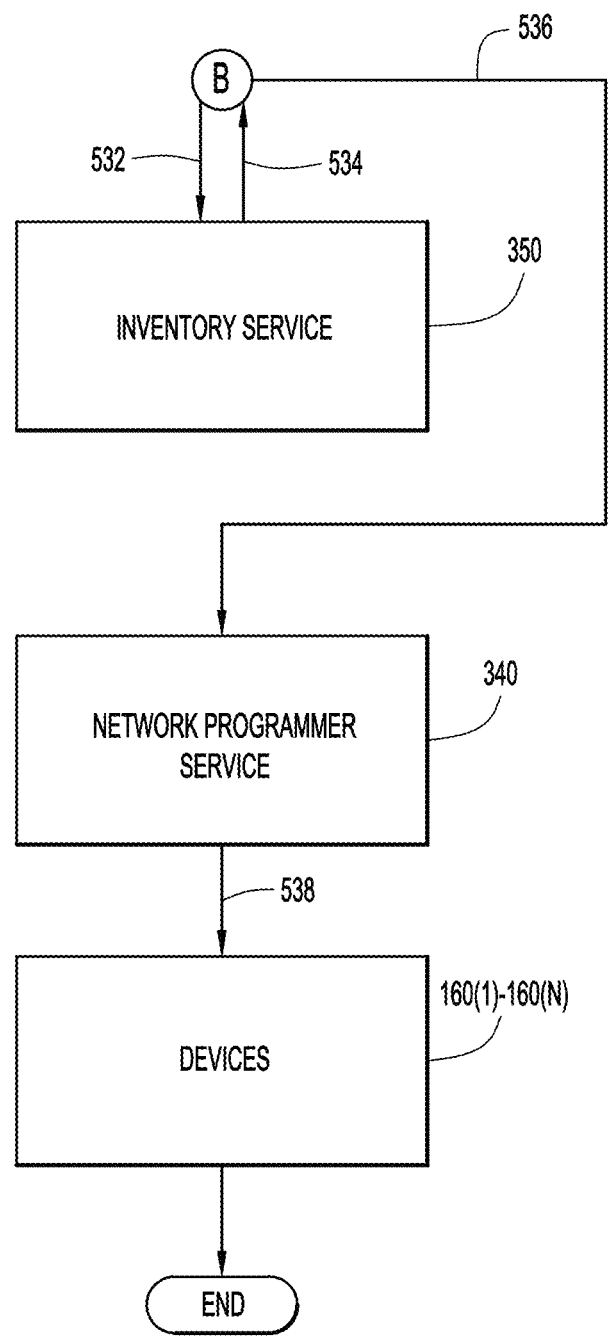

With reference to FIG. 5B, a flowchart is shown for example operations of a method performed by controller 120 to identify and isolate one or more potentially infected network devices, e.g., devices 160(1)-160(N). Reference may also be made to FIGS. 1-4 in connection with the description of FIG. 5B.

Initially, at 532, controller module 220 receives notification of a detected threat from threat detection tool 110 identifying one or more network devices 160(1)-160(N), that may be infected and, in response, sends an inquiry to inventory service module 250 requesting network configuration information, including neighbor information, associated with the one or more network devices 160(1)-160(N) identified as possibly infected. At 532, inventory service module 250 sends controller module 220 the requested network configuration information associated with the one or more infected network devices 160(1)-160(N).

At 536, controller module 220 instructs network programmer module to isolate the one or more infected network devices 160(1)-160(N) by removing the one or more infected devices 160(1)-160(N) from an access control list identifying one or more network devices 160(1)-160(N) authorized to access resources associated with an enterprise network 150, and shutting down the links between the one or more infected devices 160(1)-160(N) and the neighbors of the one or more infected devices 160(1)-160(N) identified in the network configuration information received from inventory service module 250.

At 538, network programmer module removes the one or more infected devices 160(1)-160(N) from the network access control list and shuts down the links between the one or more infected devices 160(1)-160(N) and the neighbors of the one or more infected devices 160(1)-160(N), and the process ends.

Figure 5C:
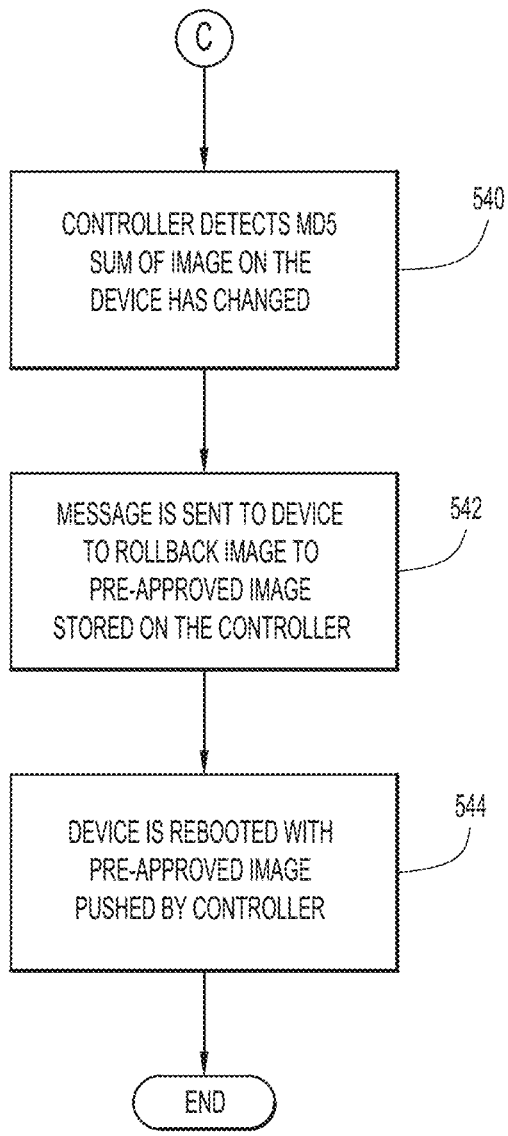

With reference to FIG. 5C, a flowchart is shown for example operations of a method performed by controller 120 to detect one or more corrupted images on one or more potentially infected network devices, e.g., devices 160(1)-160(N), and rollback the one or more corrupted images to one or more pre-approved images, according to an embodiment. Reference may also be made to FIGS. 1-4 in connection with the description of FIG. 5C.

Initially, at 540, controller 120 detects that a hash or other computation value (e.g., an MD5 sum) of one or more images resident on one or more network devices 160 (1)-160(N), has changed. According to an embodiment, controller 120 may continuously fetch an MD5 sum of one or more images stored on one or more devices 160(1)-160(N) and compare the one or more fetched MD5 sums with corresponding MD5 sums previously stored in memory 310 to determine whether one or more of the fetched MD5 sums has changed. For example, if a fetched MD5 sum of an image resident on a network device is not the same as a previously stored MD5 sum corresponding to that network device, this may indicate that an unauthorized user is attempting to boot that network device with a corrupted image. According to a further embodiment, the fetched MD5 sums of one or more images may be the MD5 sum of a complete image of the image resident on a network device or it may be an MD5 sum of a partial image of the image resident on the network device.

At 542, in response to detecting that one or more images stored on one or more devices 160(1)-160(N), controller 120 retrieves one or more preapproved images from memory 310, forwards the one or more pre-approved images to the one or more devices 160(1)-160(N) on which a stored image has changed, and instructs the one or more devices 160 to rollback the one or more stored images to the one or more preapproved images. At 544, the one or more network devices 160(1)-160(N) receives the one or more preapproved images and is rebooted with the one or more pre-approved images pushed by controller 120, and the process ends.

Figure 5D:
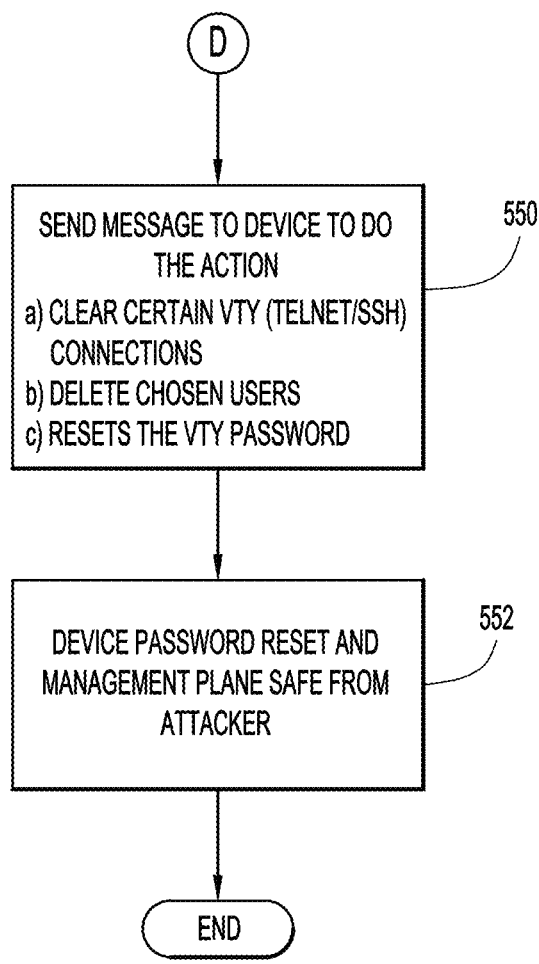

With reference to FIG. 5D, a flowchart is shown for example operations of a method performed by controller 120 to clear remote access lines to one or more network devices, e.g., devices 160(1)-160(N), according to an embodiment. Reference may also be made to FIGS. 1-4 in connection with the description of FIG. 5D.

Initially, at 550, controller 120 determines to clear one or more remote access lines to one or more network devices 160(1)-160(N). According to an embodiment, controller 120 may determine to clear the one or more remote lines to the one or more network devices 160(1)-160(N) in conjunction with the implementation of another mitigation action. According to a further embodiment, controller 120 may determine to clear the one or more remote lines to one or more network devices 160(1)-160(N) asynchronously, i.e., at any point of time. Controller 120, at 550, may instruct one or more network devices 160(1)-160(N) to clear one or more remote connections to the one or more network devices 160(1)-160(N), terminate one or more active sessions of one or more unauthorized users and delete the one or more unauthorized users from an access list associated with the one or more network devices 160(1)-160(N), and reset one or more passwords associated with the one or more devices 160(1)-160(N). According to an embodiment, the remote access lines may be one or more virtual teletype lines ("vty"). According to a further embodiment, the one or more passwords associated with the one or more devices 160(1)-160(N) may be to one or more passwords pre-approved by an authorized system administrator. According to a further embodiment, controller 120 may initiate a password reset on the one or more devices 160(1)-160(N) on a periodic basis, e.g., every two weeks, or may initiate a password reset whenever a threat is detected to the one or more network devices 160(1)-160(N).

At 552, the one or more network devices 160(1)-160(N) resets one or more access passwords to the one or more network devices 160(1)-160(N), ensuring that the management plane is safe from unauthorized users, and the process ends.

Figure 5E:
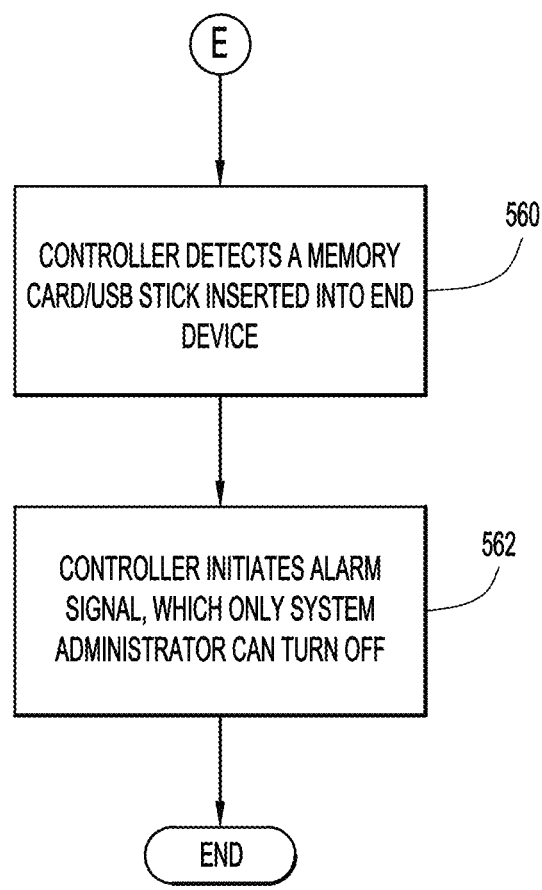

With reference to FIG. 5E, a flowchart is shown for example operations of a method performed by controller 120 to initiate an alarm signal upon detecting that a user has inserted one or more external cards into one or more network devices 160(1)-160(N), according to an embodiment. Reference may also be made to FIGS. 1-4 in connection with the description of FIG. 5E.

Initially, at 560, controller 120 detects that a user has inserted one or more external cards into one or more network devices 160(1)-160(N). According to an embodiment, the one or more external cards may be a memory card or a Universal Serial Bus (USB) stick. In response to detecting that a user has inserted one or more external cards into one or more network devices 160(1)-160(N), controller 120, at 562, generates an alarm signal that only an authorized system administrator may turn off, and the process ends. According to an embodiment, if an authorized system fails to turn off the alarm signal, controller 120 assumes that the user who inserted one or more external cards into the one or more network devices 160(1)-160(N) is unauthorized and may initiate another mitigation action, e.g., resetting access passwords to the one or more devices 160(1)-160(N).

Figure 6:
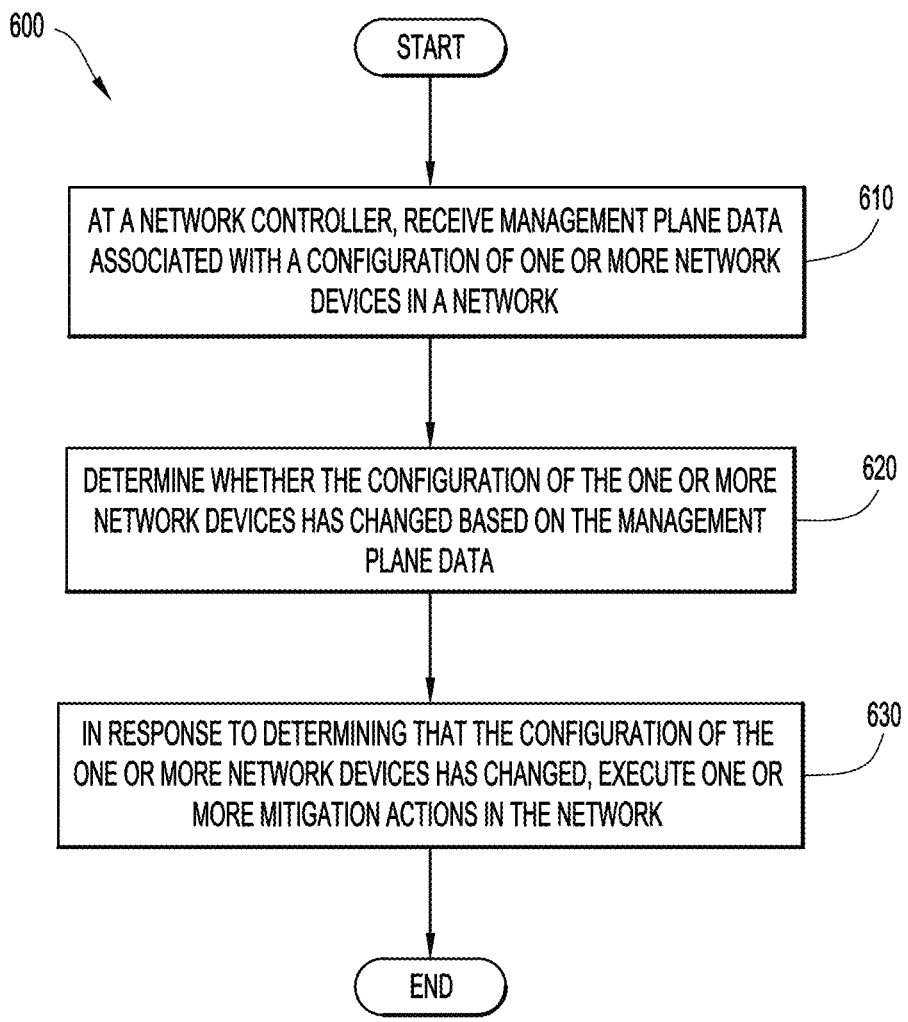
FIG. 6 is a high-level flowchart of operations performed to mitigate potential damages caused by a configuration change on one or more network devices, according to an example embodiment.

With reference to FIG. 6, a high-level flowchart is shown of example operations of a method performed by controller 120 to mitigate potential damages to enterprise network 150 when a configuration change is detected at one more network devices 160, according to an embodiment. Reference may also be made to the previous figures in connection with the description of FIG. 6.

At 610, a network controller 120 receives management plane information (reports) associated with a configuration of one or more network devices 160 in an enterprise network 150. At 620, the network controller 120 determines whether the configuration of the one or more network devices 160 has potentially changed based on the received management plane information. At 630, in response to determining that the configuration of the one or more network devices 160 has changed, the network controller 120 executes one or more mitigation actions in the network 150, and the process ends.

In summary, a method is disclosed in which the risk of one or more advanced persistent threats is detected at one or more network devices. In response to detecting the threat to network resources, a centralized controller may implement one or more mitigation actions designed to minimize the vulnerability caused by the one or more detected threats. Accordingly, a centralize controller may instruct one or more network devices to take appropriate mitigation actions depending on the nature of the one or more threats detected at the one or more network devices.

Advantages of the embodiments include providing an additional layer of security to prevent unauthorized access to network resources and to protect the integrity of management plane information in a software defined network. Given that many users do not regularly change their access passwords, and may even use factory-configured default passwords, e.g., "Cisco123," the security features of the disclosed invention may have enormous value to a variety of end users, protecting critical financial and data-sensitive infrastructures. For example, one recent APT compromised the integrity of many critical network infrastructures, gaining access to system resources by stealing or hacking access passwords and causing millions of dollars in damage.

The disclosed method and system may prevent such malicious attack from comprising network resources by proactively polling one or more network devices to initiate one or more appropriate mitigation actions depending on the nature of the detected threat, e.g., lock messages and initiate a password reset at configurable intervals. For example, the disclosed embodiments may leverage a PnP or other similar protocol to periodically receive notifications from one or more network devices and, in response, initiate one or more mitigation actions to minimize the risks associated with the threats indicated in the received notifications. Furthermore, the disclosed embodiments are scalable, allowing mitigation actions to be implemented across an enterprise network that could span hundreds of thousands of devices. Accordingly, the disclosed embodiments provide security solutions whereby a system administrator may effectively secure an entire enterprise network in response to one or more detected threats.

In one form, a method is provided comprising: at network controller, receiving management plane information associated with a configuration of one or more network devices in a network; determining whether the configuration of the one or more network devices has changed based on the management plane information; and, in response to determining that the configuration of the one or more network devices has changed, executing one or more mitigation actions in the network.

In another form, an apparatus is provided comprising: a network interface unit that enables network communications with one or more network devices; and a processor, coupled to the network interface unit, and configured to: receive management plane information associated with a configuration of the one or more network devices in a network; determine whether the configuration of the one or more network devices has changed based on the management plane information; and, in response to determining that the configuration of the one or more network devices has changed, execute one or more mitigation actions in the network.

In yet another form, a non-transitory processor readable medium storing instructions that, when executed by a processor, cause the processor to: receive management plane information associated with a configuration of the one or more network devices in the network; determine whether the configuration of the one or more network devices has changed based on the management plane information; and, in response to determining that the configuration of the one or more network devices has changed, execute one or more mitigation actions in the network.

The above description is intended by way of example only. Various modifications and structural changes may be made therein without departing from the scope of the concepts described herein and within the scope and range of equivalents of the claims.

What is claimed is:

1. A method comprising:
   at a network controller, receiving management plane information associated with a configuration of one or more network devices in a network;
   determining whether the configuration of the one or more network devices has changed based on the management plane information;
   receiving a list of one or more interfaces connecting one or more neighbor devices to the one or more network devices when a configuration change has occurred on the one or more network devices or the one or more network devices has not responded to one or more polling signals; and
   in response to determining that the configuration of the one or more network devices has changed, executing one or more mitigation actions in the network, the one or more mitigation actions comprising tearing down the one or more interfaces connecting the one or more neighbor devices to the one or more network devices when a configuration change has occurred or the one or more network devices is determined to not be reachable.

2. The method of claim 1, wherein the management plane information is received in response to a management information request sent from the network controller.

3. The method of claim 1, wherein determining whether the configuration of the one or more network devices has changed is based at least on data received from a threat detection subsystem.

4. The method of claim 1, wherein determining whether the configuration of the one or more network devices has changed further comprises determining whether the change to the configuration of the one or more network devices was authorized.

5. The method of claim 4, wherein the executing one or more mitigation actions further comprises:
   sending to one or more users associated with the one or more network devices a notification that the configuration associated with the one or more network devices has changed; and
   installing a pre-approved configuration file on the one or more network devices.

6. The method of claim 1, wherein determining whether the configuration of the one or more network devices has changed further comprises determining whether the network controller has received the management plane information associated with the configuration of the one or more network devices within a predetermined time interval.

7. The method of claim 6, further comprising:
   receiving a list of one or more network devices when a configuration change has occurred on the one or more network devices or the one or more network devices has not responded to one or more polling signals within a predetermined time interval; and
   removing from a network access list the one or more network devices when a configuration change has occurred or the one or more network devices is determined to not be reachable.

8. The method of claim 1, wherein determining whether the configuration of the one or more network devices has changed further comprises determining whether a hash computation associated with one or more configuration images on the one or more network devices has changed.

9. The method of claim 8, wherein the executing one or more mitigation actions further comprises:

installing a pre-approved configuration image on the one or more network devices when the hash computation associated with one or more configuration images has changed; and rebooting the one or more network devices using the pre-approved configuration image.

10. The method of claim 1, wherein determining whether the configuration of the one or more network devices has changed further comprises determining whether one or more passwords associated with the one or more network devices has changed.

11. The method of claim 10, wherein the executing one or more mitigation actions further comprises:

clearing one or more remote access lines to the one or more network devices when the one or more passwords has changed;

removing, from a network access list, one or more users associated with the one or more remote access lines; and resetting the one or more passwords associated with the one or more network devices when the one or more passwords have changed.

12. The method of claim 1, wherein determining whether the configuration of the one or more network devices has changed further comprises determining whether one or more memory devices has been inserted into the one or more network devices.

13. The method of claim 12, wherein the executing one or more mitigation actions further comprises sending an alarm communication to one or more users associated with the one or more network devices.

14. An apparatus comprising:

a network interface unit that enables network communications with one or more network devices; and a processor, coupled to the network interface unit, and configured to:

receive management plane information associated with a configuration of the one or more network devices in a network;

determine whether the configuration of the one or more network devices has changed based on the management plane information;

receive a list of one or more interfaces connecting one or more neighbor devices to the one or more network devices when a configuration change has occurred on the one or more network devices or the one or more network devices has not responded to one or more polling signals; and in response to determining that the configuration of the one or more network devices has changed, execute one or more mitigation actions in the network, the one or more mitigation actions comprising tearing down the one or more interfaces connecting the one or more neighbor devices to the one or more network devices when a configuration change has occurred or the one or more network devices is determined to not be reachable.

15. The apparatus of claim 14, wherein the processor is configured to determine whether the configuration of the one or more network devices has changed based at least on data received from a threat detection subsystem.

16. The apparatus of claim 14, wherein the processor is configured to determine whether the configuration of the one or more network devices has changed by:

determining whether the change to the configuration of the one or more network devices was authorized.

17. The apparatus of claim 16, wherein the processor is configured to execute one or more mitigation actions by:

send to the one or more users associated with the one or more network devices a notification indicating that the configuration associated with the one or more network devices has changed; and install a pre-approved configuration file on the one or more network devices.

18. A non-transitory processor readable medium storing instructions that, when executed by a processor of a network controller associated with network devices in a network, cause the processor to:

receive management plane information associated with a configuration of the one or more network devices in the network;

determine whether the configuration of the one or more network devices has changed based on the management plane information;

receive a list of one or more interfaces connecting one or more neighbor devices to the one or more network devices when a configuration change has occurred on the one or more network devices or the one or more network devices has not responded to one or more polling signals; and in response to determining that the configuration of the one or more network devices has changed, execute one or more mitigation actions in the network, the one or more mitigation actions comprising tearing down the one or more interfaces connecting the one or more neighbor devices to the one or more network devices when a configuration change has occurred or the one or more network devices is determined to not be reachable.

19. The non-transitory processor readable medium of claim 18, wherein the instructions operable for determining whether the configuration of the one or more network devices has changed further comprise instructions operable for determining whether the change to the configuration of the one or more network devices was authorized by one or more users associated with the one or more network devices.

20. The non-transitory processor readable medium of claim 19, wherein the instructions operable for executing one or more mitigation actions further comprise instructions operable for:

sending to one or more users associated with the one or more network a notification indicating that the configuration associated with the one or more network devices has changed; and installing a pre-approved configuration file on the one or more network devices.

* * * * *